No. 840,488. PATENTED JAN. 8, 1907.
J. I. HAMAKER.
COMBINED HEATING AND COOKING STOVE.
APPLICATION FILED DEC. 12, 1905.

2 SHEETS—SHEET 1.

WITNESSES:

INVENTOR
John I. Hamaker
BY
ATTORNEYS

No. 840,488.

PATENTED JAN. 8, 1907.

J. I. HAMAKER.
COMBINED HEATING AND COOKING STOVE.
APPLICATION FILED DEC. 12, 1905.

2 SHEETS—SHEET 2.

WITNESSES:

INVENTOR
John I. Hamaker.
BY Munn & Co.

ATTORNEYS

UNITED STATES PATENT OFFICE.

JOHN IRVIN HAMAKER, OF COLLEGE PARK, VIRGINIA.

COMBINED HEATING AND COOKING STOVE.

No. 840,488.      Specification of Letters Patent.      Patented Jan. 8, 1907.

Application filed December 12, 1905. Serial No. 291,377.

*To all whom it may concern:*

Be it known that I, JOHN IRVIN HAMAKER, a citizen of the United States, and a resident of College Park, in the county of Campbell and State of Virginia, have made certain new and useful Improvements in a Combined Heating and Cooking Stove, of which the following is a specification.

My improved stove is so constructed that it may be produced at small cost.

It practically combines an oven, a water-heater, a steam-cooker, and a warming-chamber, all arranged with a view to the greatest economy of heat and consequently of fuel.

The details of construction, arrangement, and combination of parts are as hereinafter described, reference being had to the accompanying drawings, in which—

Figure 1:
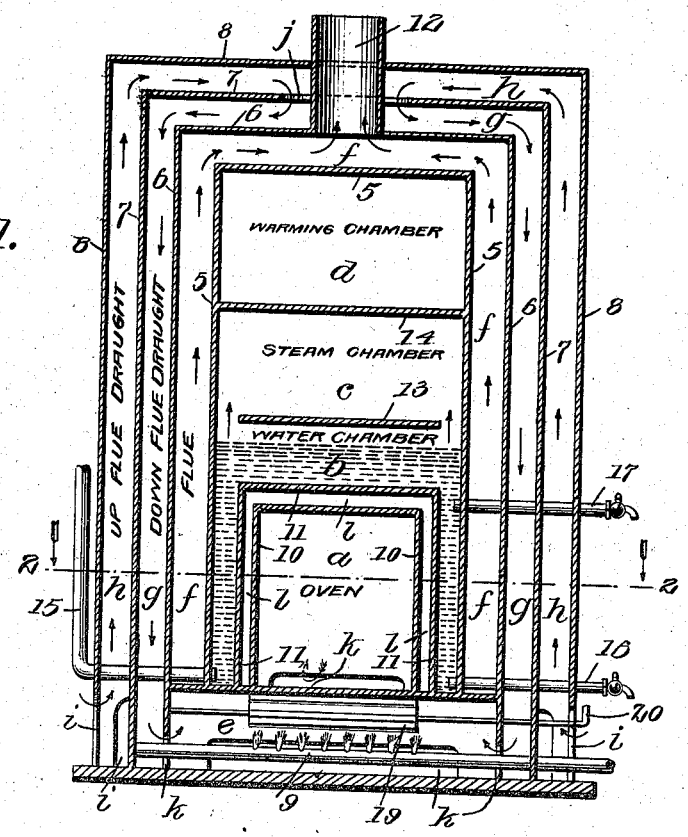
Figure 2:
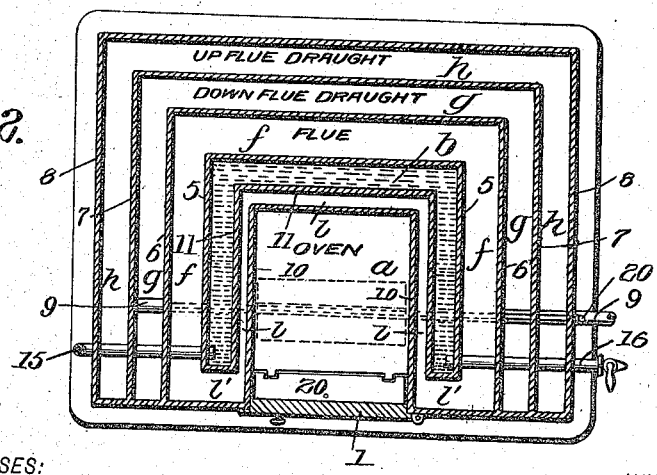
Figure 3:
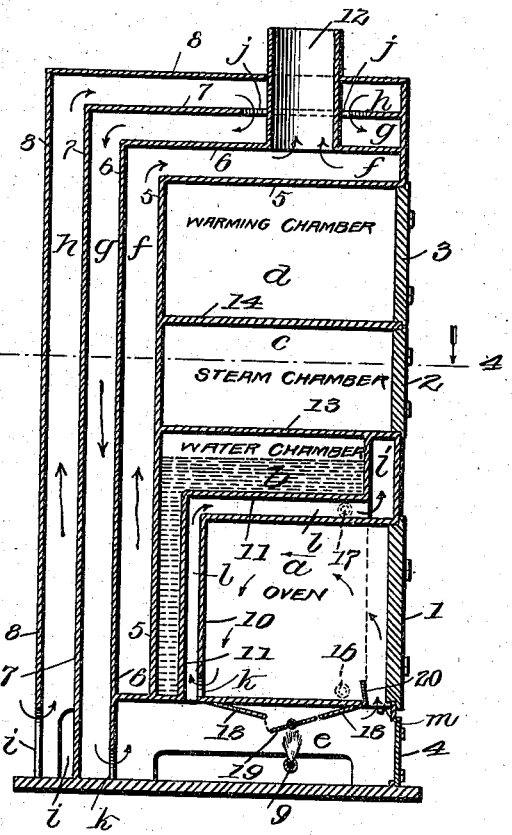
Figure 4:
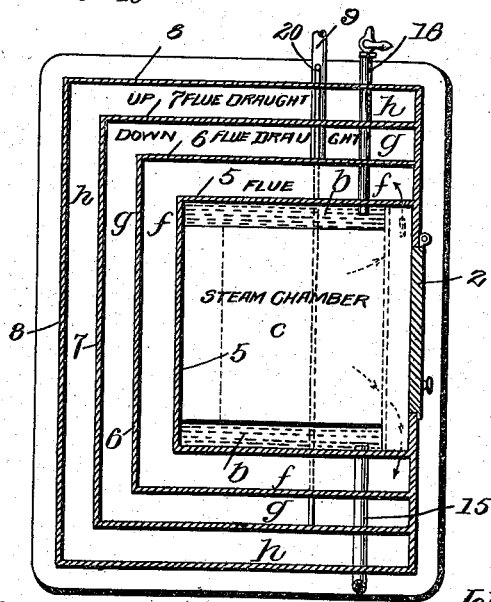

Figure 1 is a sectional elevation of the stove, the plane of section being parallel to the front. Fig. 2 is a horizontal section on the line 2 2 of Fig. 1. Fig. 3 is a vertical central section on a line at right angles to that shown in Fig. 1. Fig. 4 is a horizontal section on the line 4 4 of Fig. 3.

In the following description, for sake of clearness, the structural parts will be indicated by numerals, and the spaces intervening or surrounding such parts by lower-case letters.

$a$ indicates an oven, $b$ a water-chamber, $c$ a steam-chamber, and $d$ a warming-chamber, which are arranged one above another, and all but the water-chamber being provided with doors, indicated, respectively, by numerals 1, 2, and 3. (See especially Fig. 3.) Beneath the oven $a$ and extended laterally beyond it is a combustion-chamber $e$, for which a door 4 is provided. (See Fig. 3.) The oven, water-chamber, steam-chamber, and warming-chamber are inclosed on all but the front sides by a sheet-metal shell 5. Exterior to this shell 5 are shells 6, 7, and 8, all spaced apart on all sides save the front and the bottom, and thus forming spaces $f$ $g$ $h$, whose functions will be hereinafter described. The water space or chamber exists between the shells 5 and 11, and the bottom 13 of the steam-chamber is cut away, as indicated in Fig. 1, on two sides, so that steam has free entrance into the same. The bottom 14 of the warming-closet is of course intact, or without perforations. Water is supplied to the space $b$ through a pipe 15, (see Fig. 1,) which is extended on the outer side of the stove to a point at least as high as the desired water-surface in the said space. A drain-pipe 16 with stop-cock is connected with the lower portion of the water-chamber, and a hot-water draw-off pipe 17 is similarly connected with the upper portion of the water-chamber.

The shell 8 is provided at the bottom (see Fig. 1) with an opening $i$, through which air is admitted, the same passing up in what is termed the "upflue-draft" $h$, then through the opening $j$ in the top of shell 7, and into the space $g$, which constitutes the downflue-draft. From the latter the air, which has become heated to a considerable degree, passes through an opening $k$ at the bottom of shell 6, and thus enters the combustion-chamber $e$, in which a suitable burner 9 is arranged. (See Figs. 1 and 3.) From said combustion-chamber $e$ the heated air and the unconsumed gases of combustion may take either of two courses—that is to say, they may enter the space $l$, provided between the shell 10 of the oven and a parallel shell 11, that constitutes the inner side of the water-chamber. From such flue or space $l$ the gases pass through side passages $l'$ (see Figs. 2, 3) into the flue-space proper, $f$, and thus around three sides of the steam-chamber and warming-chamber and over the top of the latter to the stovepipe collar or connection 12. As indicated in Figs. 2 and 3, the front side of the water-chamber is spaced from the front side of the stove, thus providing the side or lateral passages $l'$ before referred to. On the other hand, when desired, the heated air and products of combustion may be directed into the oven $a$ at the point $m$, Fig. 3, where an opening in the oven-bottom is provided adjacent to the door 1. This opening may be closed by a hinged valve 20, which in Fig. 3 is shown open in full lines, while in Fig. 2 it is indicated as closed. This valve is accessible and may be adjusted manually to either position by opening the door 1.

The alternative course of the heated air and gaseous products of combustion is due to the following means: Beneath the bottom of the oven (see Fig. 3) I provide fender-plates 18, which are inclined toward each other and spaced from the bottom of the oven and separated from each other. Between their inner edges is arranged a pivoted fender-plate 19, the same being provided with an operating-handle 20, that extends out at one side of the stove. It will be seen that by placing this fender-plate 19 at one or the other inclination the products of combustion will be diverted in one direction or the other correspondingly.

In Fig. 3 the plate 19 is shown inclined in such way as to direct the same through opening $m$, and thus into and through the oven $a$, as shown by arrows, the escape from the oven being provided by an opening in its rear lower angle.

Recapitulating the operation of the stove, I will state that air enters the opening $i$ at bottom of shell 8, ascends in the space $h$, passes through opening $j$ in shell 7, and descends in space $g$, and thence through opening $k$ into the combustion-chamber. The products of combustion and heated air either enter the space $l$, that mainly surrounds the oven, or else pass into and through oven $a$, and thence into the flue-space $f$, and thus to the stovepipe connection 12. It may be stated in this connection that when gasolene is employed as the fuel the valve 20 will be closed to cause products of combustion to enter flue or space $l$ direct, since the odor might be absorbed by the food being cooked; but when kerosene or ordinary illuminating-gas is used as the fuel the valve 20 may be opened to allow free passage of products of combustion through the oven.

It will be seen that I provide a circulating feed-draft which prevents almost completely the loss of heat from the surface of the stove and to a large degree also the escape of heat at the point 12. Further, the water-space provided around the oven utilizes the heat radiated from the oven and the combustion-chamber below and also from the flue-space $f$. The stove is intended for combustion of smokeless fuel—such as gas, gasolene, kerosene, charcoal, &c.—but other fuels may be employed. In practice the several shells, or any of them, may be provided with a layer of non-conducting material, such as asbestos.

I desire it understood that the arrangement of the shells or jackets spaced apart to form draft-spaces, &c., may be applied to ovens and boilers generally—for example, to water-heaters for bath-rooms, to coffee-boilers, drying-ovens, &c.

Having thus described my invention, what I claim as new, and desire to secure by Letters Patent, is—

1. The improved heating and cooking stove, comprising a series of shells, arranged parallel and spaced apart, the inner shell inclosing a warming-chamber, a steam-chamber, a water-space connected with such steam-chamber, an oven, a space surrounding the oven, and a combustion-chamber below the latter, the two outer shells 7 and 8, having openings to allow air to traverse the two adjacent spaces and enter the combustion-chamber, the products of combustion passing thence into the space around the oven and thus into an escape-flue arranged adjacent to the steam-chamber and warming-chamber.

2. In a stove of the character described, the combination of parallel shells spaced apart, and provided with openings for admission of air and products of combustion and final escape thereof, an oven arranged within the inner shell, a water-chamber exterior to the oven, and a steam-chamber located above the water-chamber and having its bottom cut away or slotted for admission of steam directly from the water-chamber, substantially as described.

3. A stove comprising a series of shells arranged parallel on the sides and at the top, and spaced apart, their front edges communicating with the front side of the stove, a combustion-chamber arranged at the base of the stove, and an oven, a water-chamber, a steam-chamber, and warming-chamber arranged one above another within the inner shell, and flue-spaces arranged around the oven and exterior to the water-chamber, steam-chamber, and warming-chamber, all substantially as described.

4. The combination with an oven, a series of shells inclosing the oven and spaced apart and a combustion-chamber communicating with the space around the oven, of inclined fender-plates arranged below the oven and spaced apart, and a pivoted oscillating plate arranged between them and serving to divert heated products of combustion laterally as described.

JOHN IRVIN HAMAKER.

Witnesses:
R. H. T. ADAMS, Jr.,
S. G. HAMNER.